March 31, 1959 — R. L. MILLER — 2,879,888
WOBBLE DISC FOR FRUIT SIZING MACHINE
Filed May 28, 1956
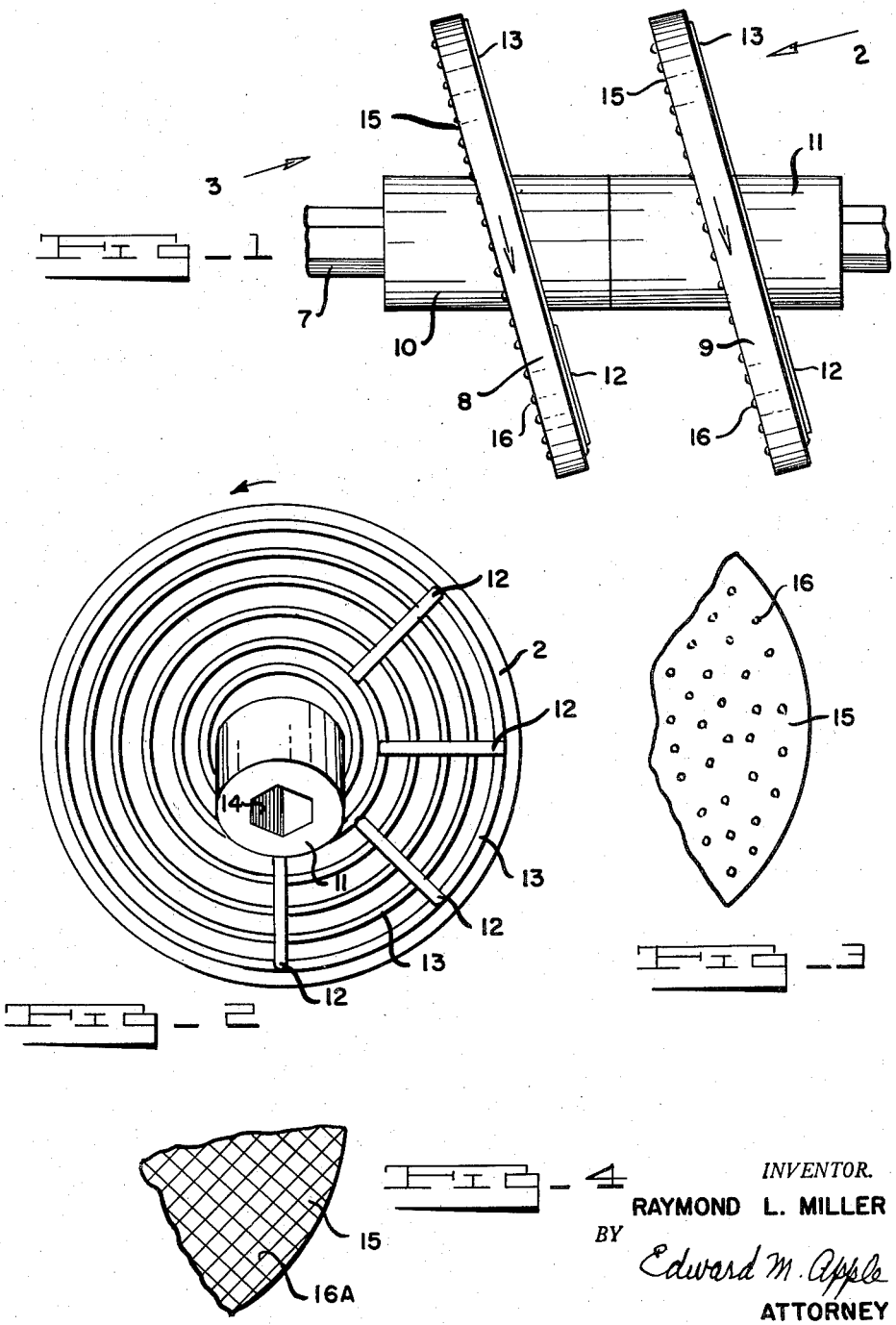
INVENTOR.
RAYMOND L. MILLER
BY Edward M. Apple
ATTORNEY

United States Patent Office 2,879,888
Patented Mar. 31, 1959

2,879,888

WOBBLE DISC FOR FRUIT SIZING MACHINE

Raymond L. Miller, Utica, Mich.

Application May 28, 1956, Serial No. 587,834

4 Claims. (Cl. 209—104)

This invention relates to fruit sizing machinery, such as disclosed in Patent No. 2,699,253, issued to me January 11, 1955.

In my issued patent, I disclosed the use of a plurality of flexible, rubber discs, for lifting fruit such as apples, from one level to another, in the sizing process.

It is an object of this invention, to generally improve such flexible, rubber discs, whereby to improve the functioning and operation of sizing machines, such as disclosed in my previous patent.

Another object of the invention is to provide a wobble disc for such a machine as previously disclosed, which is constructed and arranged in such a manner as to provide lifting means on one or both of its faces, which means lightly engage the fruit and assist in lifting it to a higher level during the operation of the machine, and which means will still permit the undersized fruit to pass between two of the discs, in a staggered path, to a lower level as previously disclosed.

Another object of the invention is to provide a disc of the character indicated, which has a plurality of radial ribs on at least one of its faces, which ribs are located in the drive, or thrust, area of the disc.

Another object of the invention is to provide a wobble disc of the character indicated, which is provided with a plurality of concentric ribs on at least one of its faces.

Another object of the invention is to provide a wobble disc for a fruit sizing machine, which is provided with means on its surfaces, which will assist in picking up perfectly round fruit, or fruit having flat surfaces thereon.

Another object of the invention is to provide a wobble disc for a machine of the character indicated, which is provided with means for assisting the discs to lift fruit, even though a substantial part of the face of the disc may be glazed with fruit wax and the like.

A still further object of the invention is to provide a wobble disc for a machine of the character indicated, which is constructed and arranged so that fruits of varying size may be accommodated between pairs of the said discs.

The foregoing and other objects and advantages of the invention will become more apparent as the description proceeds, reference being made from time to time to the accompanying drawing, forming part of the within disclosure, in which drawing:

Fig. 1 is a side elevational view of a pair of wobble discs embodying the invention, shown in operating position on the drive shaft of a machine, such as disclosed in the patent hereinabove indicated.

Fig. 2 is a front elevational view of one of the discs illustrated in Fig. 1, looking in the direction of the arrow, indicated with the numeral 2, in Fig. 1.

Fig. 3 is a fragmentary view of the opposite face of one of the discs, looking in the direction of the arrow, indicated with the numeral 3, in Fig. 1.

Fig. 4 is a view similar to Fig. 3, but showing a modified form of the surface of the disc.

Referring now more particularly to the drawing, it will be understood that in the embodiment herein disclosed, the reference character 7 indicates the drive shaft of a fruit sizing machine, such as disclosed in my previous Patent No. 2,699,253, on which drive shaft is mounted the wobble discs 8 and 9, embodying the invention. In Fig. 1, I illustrate only two of the wobble discs, but it will be understood that ordinarily nine of these discs are preferably used on the drive shaft 7, which would provide eight openings for fruit between the faces of the nine discs. Each of the discs 8 and 9 is made of synthetic rubber, preferably having an indicated "fifty" hardness Rockwell, which provides sufficient flexibility in the discs to accommodate fruit of slightly varying size, without danger of damaging the same. Each of the discs 8 and 9 has a hub portion 10 and 11, with a hexagonal bore 14 therein to accommodate the hexagonal shaft 7, so that the discs may be power driven through the shaft 7. The discs 8 and 9 are inclined approximately 15° from the vertical position, with respect to the axis of the shaft 7. The hub portions 10 and 11 of the discs serve as spacers, so that the faces of the discs are positioned approximately 3 inches apart, whereby fruit having a diameter in excess of 3 inches, may be grasped between the faces of the discs and be lifted upwardly upon the rotation of the discs in a counter-clockwise direction. When so rotated, a certain portion of the face of each disc, as shown in Fig. 2, constitutes the drive, or thrust, portion of the disc, for example, discs mounted as shown in Fig. 1, when rotated counterclockwise on the shaft 7, would provide a drive or thrust motion to move to the right in Fig. 1, an object positioned between the two discs, after the drive, or thrust, portion of the disc had passed dead center. At dead center the axes of the discs and the shaft are exactly perpendicular, so there would be no drive or thrust imparted.

As shown in Fig. 2, I provide a plurality of radial ribs 12, which are located in the drive, or thrust, area of the face (arrow 2, Fig. 1) of the disc. In addition thereto, I provide a plurality of concentric ribs 13 on the same face. The ribs 12 are thicker than the ribs 13, and function a little more positively in the lifting action of the discs, although it will be understood that in a lesser degree, the concentric ribs 13 will help lift the fruit during the drive portion of the cycle.

On the opposite faces 15 of the discs 8 and 9, as shown in Figs. 3 and 4, I provide a roughened surface, in the form of teats 16, as shown in Fig. 3, or in the form of knurls 16A, as shown in Fig. 4. These surface features cooperate with the radial ribs 12, and the concentric ribs 13, on the face of the adjacent disc, to pick up the fruit and lift it to an upper level.

It is believed that the operation of the device is obvious from the foregoing description.

Having described my invention, what I claim and desire to secure by Letters Patent is:

1. A device of the character described comprising a hub having an opening therein for receiving a drive shaft, an inclined disc secured to said hub, said disc having a plurality of concentric ribs on one of its faces, and a plurality of radial ribs on a portion of the same face of said disc.

2. A device of the character described comprising a hub having an opening therein for receiving a drive shaft, an inclined disc secured to said hub, said disc having a plurality of concentric ribs on one of its faces and a plurality of radial ribs on a portion of the same face of said disc, there being a roughened surface on the opposite face of said disc.

3. A device of the character described comprising a hub of synthetic rubber, having an indicated "fifty" hardness Rockwell, a disc of similar material integrated with said hub, said disc being inclined approximately 15° from the axis of said hub, one of the faces of said disc being provided with a plurality of concentric grooves, there being a plurality of radial ribs on a portion of said face.

4. A device of the character described comprising a hub of synthetic rubber, having an indicated "fifty" hardness Rockwell, a disc of similar material integrated with said hub, said disc being inclined approximately 15° from the axis of said hub, one of the faces of said disc being provided with a plurality of concentric grooves, there also being a plurality of radial ribs on a portion of the same face, and a roughened surface on the opposite face of said disc.

References Cited in the file of this patent

UNITED STATES PATENTS

| | | |
|---|---|---|
| 1,141,852 | Sutton et al. | June 1, 1915 |
| 1,899,737 | Ulrich | Feb. 28, 1933 |
| 2,244,546 | Stockdale | June 3, 1941 |
| 2,266,506 | Morse | Dec. 16, 1941 |
| 2,501,275 | Heller | Mar. 21, 1950 |
| 2,699,253 | Miller | Jan. 11, 1955 |
| 2,726,662 | Komuchar et al. | Dec. 13, 1955 |

FOREIGN PATENTS

| | | |
|---|---|---|
| 518,605 | Germany | Feb. 18, 1931 |
| 73,045 | Sweden | Nov. 10, 1931 |